United States Patent

Dudash et al.

[11] Patent Number: 5,673,972
[45] Date of Patent: Oct. 7, 1997

[54] VEHICLE SEAT ASSEMBLY

[75] Inventors: Eugene S. Dudash, Commerce Township; William Barr, Royal Oak, both of Mich.

[73] Assignee: Lear Corporation, Southfield, Mich.

[21] Appl. No.: 705,118

[22] Filed: Aug. 29, 1996

[51] Int. Cl.$^6$ ........................................... B60N 2/02
[52] U.S. Cl. ..................... 297/378.12; 297/216.1; 297/396; 297/DIG. 2
[58] Field of Search ................ 297/378.12, 378.1, 297/216.1, 396, 452.29, 452.34, DIG. 2, 452.18, 391, 216.13, 216.12; 74/500.5, 501.6

[56] References Cited

U.S. PATENT DOCUMENTS

| | | | |
|---|---|---|---|
| 4,900,088 | 2/1990 | Bechtle et al. | 297/378.12 |
| 5,588,707 | 12/1996 | Bolsworth et al. | 297/378.12 |

FOREIGN PATENT DOCUMENTS

| | | | |
|---|---|---|---|
| 2353415 | 12/1977 | France | 297/378.12 |
| 3042713 | 5/1982 | Germany | 297/378.12 |
| 404183411 | 6/1992 | Japan | 297/378.12 |

*Primary Examiner*—Milton Nelson, Jr.
*Attorney, Agent, or Firm*—Brooks & Kushman

[57] ABSTRACT

A vehicle seat assembly comprises a lower support frame with a seat back frame pivotally connected to the lower support frame. The back frame includes a headrest portion with an aperture formed therethrough. First and second recliner brackets are secured to the lower support frame between the lower support frame and seat back frame, and each recliner bracket forms a slot therein. A seat dump mechanism includes a lever extending from the aperture with first and second cables operatively connected to the lever. First and second lock-pins are operatively connected to the cable and selectively movable between the first position in which the first and the second lock-pins are engaged within the first and second slots, and a second position in which the first and second lock-pins are disengaged from the first and second slots such that the back frame is disengaged from the recliner to allow pivotal movement of the back frame with respect to the lower support frame. The release lever is positioned within a lever housing which is loosely fit within the aperture in the headrest portion to facilitate disengagement of the lever housing from the aperture in a high energy impact.

7 Claims, 3 Drawing Sheets

VEHICLE SEAT ASSEMBLY

TECHNICAL FIELD

The present invention relates to a vehicle seat assembly, and more particularly to a vehicle seat assembly including a seat-dump mechanism.

BACKGROUND OF THE INVENTION

Vehicle seat-dump mechanisms allow the vehicle occupant to release the seat back for pivotal movement with respect to the lower seat to allow access to the rear seating compartment. Typically, a vehicle seat-dump mechanism is inconveniently located at a very low position on the seat, usually adjacent the hinge point between the lower seat and seat back. This seat-dump lever location requires the operator to bend over in order to release the seat-dump mechanism to access the vehicle rear seat compartment. It also requires use of two hands in dumping the seat forward: one hand to release the mechanism and another hand to push the seat forward.

A more convenient position for the seat-dump lever would be behind the headrest. However, positioning the seat-dump lever behind the headrest would require a support housing within the headrest, which may be uncomfortable in daily use.

DISCLOSURE OF THE INVENTION

The present invention overcomes the above-reference shortcomings of prior art vehicle seat assemblies by providing a seat assembly with a seat-dump mechanism having a release lever positioned behind the headrest, including a lever housing which is loosely fit within an aperture in the back frame to facilitate disengagement of the lever housing from the aperture in a high energy impact.

More specifically, the present invention provides a vehicle seat assembly comprising a lower support frame with a seat back frame pivotally connected with respect to the lower support frame about a hinge axis. The seat back frame comprises a headrest portion with an aperture formed therethrough. First and second recliner brackets are positioned between the lower support frame and the seat back frame, and each recliner bracket forms a slot therein. A seat-dump mechanism is provided with a lever extending from the aperture, and first and second cables operatively connected to the lever. First and second lock-pins are operatively connected with the cables and engaged with the back frame at a position offset from the hinge axis. The first and second lock-pins are selectively moveable between a first position in which the first and second lock-pins are engaged in the first and second slots, respectively, and a second position in which the first and second lock-pins are disengaged from the first and second slots such that the seat back frame is disengaged from the recliner to allow pivotal movement of the back frame with respect to the lower support frame.

The seat-dump mechanism includes a lever housing which is supported in a structural reaction injection molded (SRIM) back frame aperture. The lever housing is loosely fit within the aperture to facilitate disengagement of the lever housing from the aperture in a high energy impact.

Accordingly, an object of the present invention is to provide a vehicle seat assembly comprising a seat-dump mechanism having a release lever which is conveniently located behind the headrest.

A further object of the present invention is to provide a vehicle seat assembly including a seat-dump mechanism positioned behind the seat headrest when the mechanism includes a lever housing which is loosely supported by the seat back frame to facilitate disengagement of the lever housing in a high energy impact.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
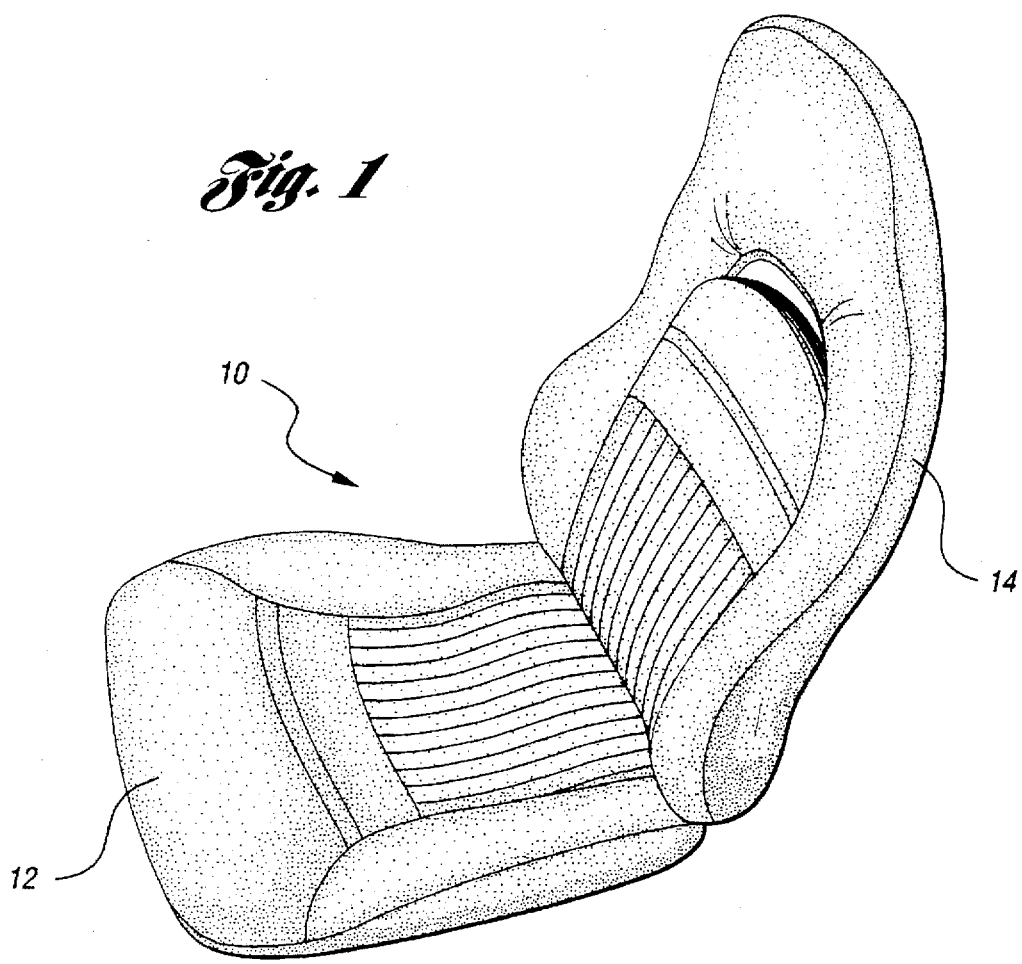
FIG. 1 shows a perspective view of a vehicle seat assembly in accordance with the present invention.
Figure 2:
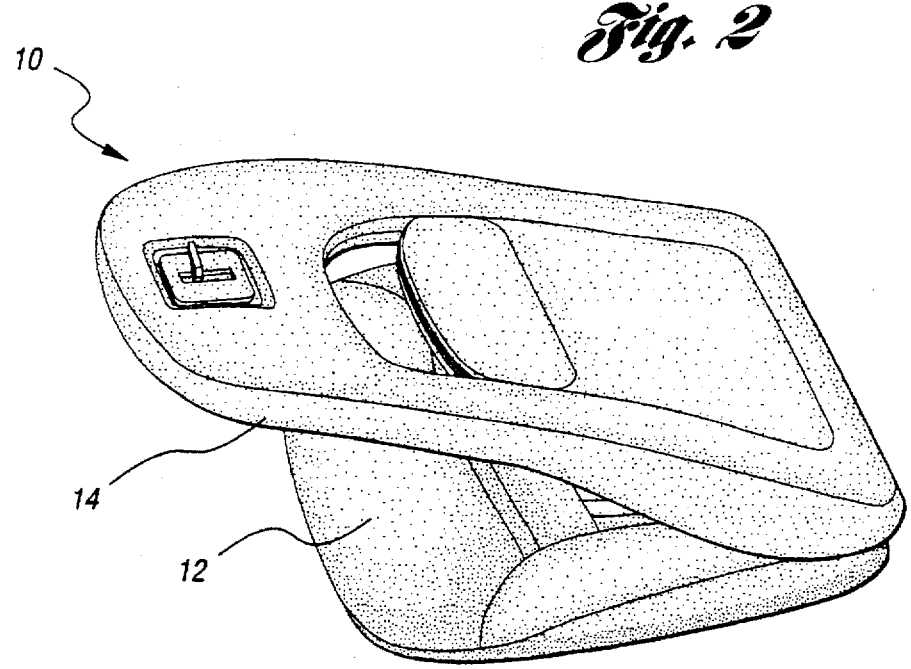
FIG. 2 shows a perspective view of the vehicle seat assembly of FIG. 1 wherein the seat back is in the dumped position.

Referring to FIGS. 1 and 2, a vehicle seat assembly 10 is shown in accordance with the present invention. The vehicle seat assembly 10 includes a lower seat 12 and a seat back 14. FIG. 2 shows the seat back 14 in the dumped position to allow access to the vehicle rear seat compartment. In order to facilitate this "dumping" of the seat back, the hinge point between the lower seat 12 and seat back 14 must be released to allow pivotal movement therebetween. The present invention provides this hinge point release by means of a conveniently located release lever, as described below.

Turning to FIGS. 3-7, the vehicle seat support assembly comprises a lower seat frame 16 pivotally connected to a contoured structural reaction injection molded (SRIM) seat back frame 18 along hinge points 20,22 extending through a hinge axis. The lower seat frame 16 includes a cushion seat frame assembly (or flexilator) 24, side shields 28, and a recliner mechanism 30. The seat back frame 18 includes a lumbar support mechanism 32 cooperating with a lumbar aperture 34 formed in the back frame 18, as well as side bolster flip paddles 36,38 cooperating with inflatable bladders (not shown) for side bolster adjustment.

The seat back frame 18 also supports the seat-dump mechanism 40. The seat-dump mechanism 40 comprises a release lever 42 extending from lever housing 44, which forms an interference-type snap fit within the aperture 46 formed in the headrest portion 48 of the back frame 18. The housing 44 is loosely fit within the aperture 46 to facilitate disengagement of the lever housing 44 from the aperture 46 in the high energy impact.

Figure 3:
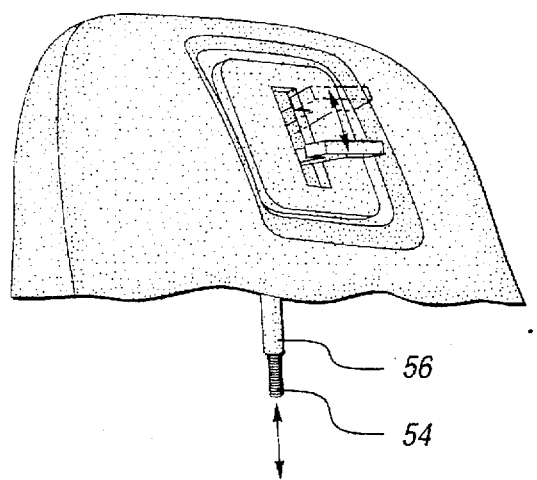
FIG. 3 shows a cut-away rear perspective view of the headrest portion of a seat back in accordance with the present invention.
Figure 4:
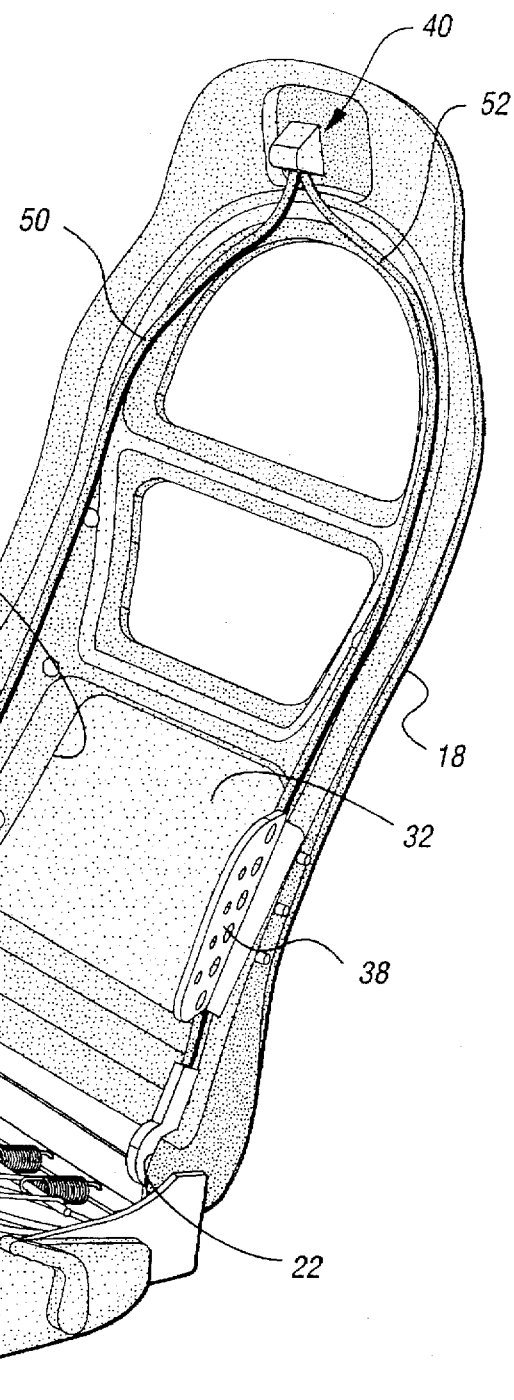
FIG. 4 shows a perspective view of a vehicle seat support frame and dump mechanism assembly in accordance with the present invention.
Figure 5:
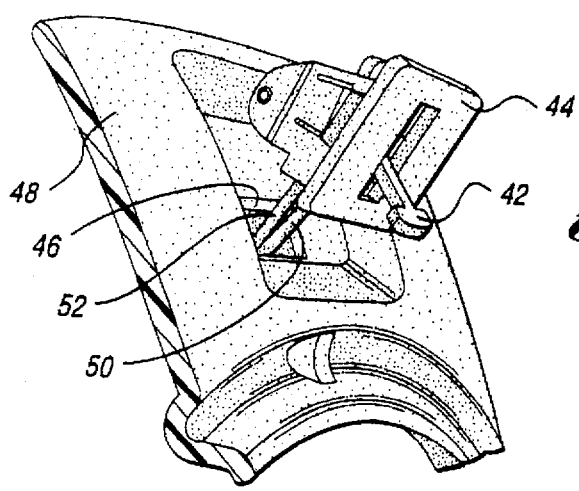
FIG. 5 shows a cut-away perspective view of a lever housing removed from the seat back frame aperture in accordance with the present invention.
Figure 6:
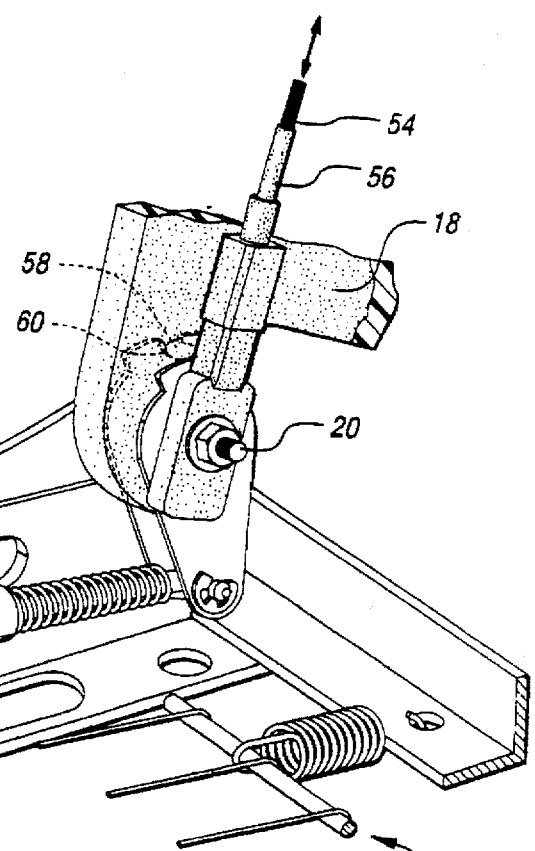
FIG. 6 shows a cut-away perspective view of a seat dump mechanism attachment at the hinge point between a seat back frame and lower support frame in accordance with the present invention.
Figure 7:
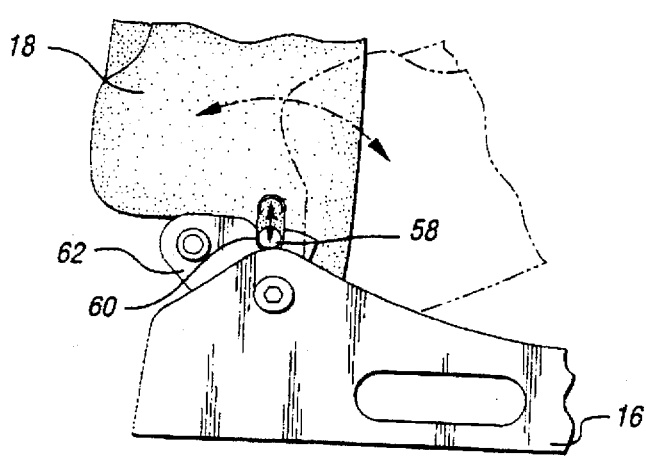
FIG. 7 shows a cut-away side view of a lock-pin, recliner, seat back frame and lower support frame in accordance with the present invention, with the dumped position shown in phantom.

First and second cables 50,52 are operatively connected to the lever 42 and extend from the lever housing 44 to the hinge points 20,22. The cables 50,52 each include a wire 54 disposed within a flexible sheath 56, as shown in FIG. 3. Each wire 54 is operatively connected to a respective lock-pin 58 at the opposing hinge points. Each lock-pin 58 is engaged with the back frame 18 at a position offset from the respective hinge point 20,22. The offset is most clearly seen in FIGS. 6 and 7, which show the pin 58 offset from the hinge point 20. Each lock-pin 58 is selectively movable between first and second positions, as illustrated in FIG. 7. In the first position, the lock-pin 58 is engaged within the slot 60 formed in the respective recliner bracket 62, which is secured to the lower support frame 16, in order to prevent pivotal movement of the back frame 18 with respect to the recliner bracket 62 and lower support frame 16. In the second position, shown in phantom in FIG. 7, the lock pin 58 is disengaged from the respective slot 60 in the recliner bracket 62 to allow pivotal movement of the back frame 18 with respect to the recliner bracket 62 and lower support frame 16. In this configuration, by moving the lever 42, the cables 50,52 move the lock-pins from the respective slots, and the seat back 14 may be disengaged from the lower seat 12 at the recliner brackets 62 to allow the seat back 14 to be dumped forward to allow access to the vehicle rear seating compartment.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:

a lower support frame;

a seat back frame pivotally connected with respect to the lower support frame about a hinge axis, said seat back frame comprising a head rest portion with an aperture formed therethrough;

a first recliner bracket secured to the lower support frame between the lower support frame and seat back frame, said recliner bracket forming a first slot therein; and a seat-dump mechanism comprising a lever extending from said aperture, a cable operatively connected to the lever, and a first lock-pin operatively connected with the cable and engaged with the back frame at a position offset from said hinge axis, said first lock-pin being selectively moveable between a first position in which the first lock-pin is engaged in the first slot to prevent pivotal movement of the back frame with respect to the lower support frame, and a second position in which the first lock-pin is disengaged from the first slot such that the seat back frame is disengaged from said first recliner bracket to allow pivotal movement of the back frame with respect to the lower support frame.

2. The vehicle seat assembly of claim 1, wherein said seat-dump mechanism further comprises a lever housing for supporting said lever, wherein said lever housing is loosely fit within said aperture to facilitate disengagement of the lever housing from the aperture in a high-energy impact.

3. The vehicle seat assembly of claim 1, further comprising a second recliner bracket positioned between the lower support frame and seat back frame, said second recliner bracket forming a second slot therein, and a second lock-pin operatively connected with the lever and selectively moveable between a first position in which the second lock-pin is engaged in the second slot and a second position in which the second lock-pin is disengaged from the second slot.

4. The seat assembly of claim 1, wherein said seat back frame comprises a structural reaction injection molded material.

5. A vehicle seat assembly, comprising:

a lower support frame;

a structural reaction injection molded seat back frame pivotally connected with respect to the lower support frame about a hinge axis, said seat back frame comprising a head rest portion with an aperture formed therethrough;

first and second recliner brackets secured to the lower support frame between the lower support frame and back frame, each said bracket forming a slot therein; and a seat-dump mechanism comprising a lever extending from said aperture, first and second cables operatively connected to the lever, and first and second lock-pins operatively connected with the lever and engaged with the back frame at a position offset from said hinge axis, said lock-pins being simultaneously movable between a first position engaged within the respective slot for locking the back frame from a pivotal movement with respect to the lower support frame, and a second position disengaged from the respective slot to allow pivotal movement of the back frame with respect to the lower support frame.

6. The vehicle seat assembly of claim 5, wherein said seat-dump mechanism further comprises a lever housing for supporting said lever, wherein said lever housing is loosely fit within said aperture to facilitate disengagement of the lever housing from the aperture in a high-energy impact.

7. A vehicle seat assembly, comprising:

a lower support frame;

a structural reaction injection molded seat back frame pivotally connected with respect to the lower support frame about a hinge axis, said seat back frame including a headrest portion with an aperture formed therethrough;

first and second recliner brackets secured to the lower support frame between the lower support frame and seat back frame, said recliner brackets forming first and second slots therein, respectively; and a seat-dump mechanism comprising a housing positioned within the aperture and having a lever extending from the housing, first and second cables operatively connected to the lever, first and second lock-pins operatively connected with the first and second cables, respectively, said first and second lock-pins being engaged with the back frame at a position offset from the hinge axis and selectively moveable between a first position in which the first and second lock-pins are engaged in the respective slot and a second position in which the first and second lock-pins are disengaged from the respective slot such that the seat back frame is disengaged from the first and second recliner bracket to allow pivotal movement of the back frame with respect to the lower support frame, wherein said housing is loosely fit within the aperture to facilitate disengagement of the lever housing from the aperture in a high-energy impact.

* * * * *